United States Patent [19]

Bradus et al.

[11] 4,237,610
[45] Dec. 9, 1980

[54] PORTABLE, ELECTRICALLY ENERGIZED, CORDLESS GRASS TRIMMER

[75] Inventors: Robert Bradus, Randallstown; Thomas J. Howard, Jr., White Marsh; John W. Miller, Parkton, all of Md.

[73] Assignee: Black and Decker Manufacturing Company, Towson, Md.

[21] Appl. No.: 934,744

[22] Filed: Aug. 21, 1978

[51] Int. Cl.³ .................... A01D 35/26; A01D 55/18
[52] U.S. Cl. ......................................... 30/276; 56/12.7
[58] Field of Search .................. 30/276, 347; 56/12.7

[56] References Cited

U.S. PATENT DOCUMENTS

| 3,831,278 | 8/1974 | Voglesonger | 30/276 |
| 3,877,146 | 4/1975 | Pittinger | 30/276 |
| 4,062,114 | 12/1977 | Luick | 56/12.7 X |
| 4,089,114 | 5/1978 | Doolittle | 30/276 |

*Primary Examiner*—Jimmy C. Peters
*Attorney, Agent, or Firm*—Frank J. Thompson; Edward D. Murphy; Leonard Bloom

[57] ABSTRACT

A portable, electrically energized, cordless grass trimmer device is disclosed having a rotatable hub which is adapted to alternatively mount, for substantially balanced rotation therewith, a flexible cutter strip and a line cutter and mechanical counterbalance.

19 Claims, 11 Drawing Figures

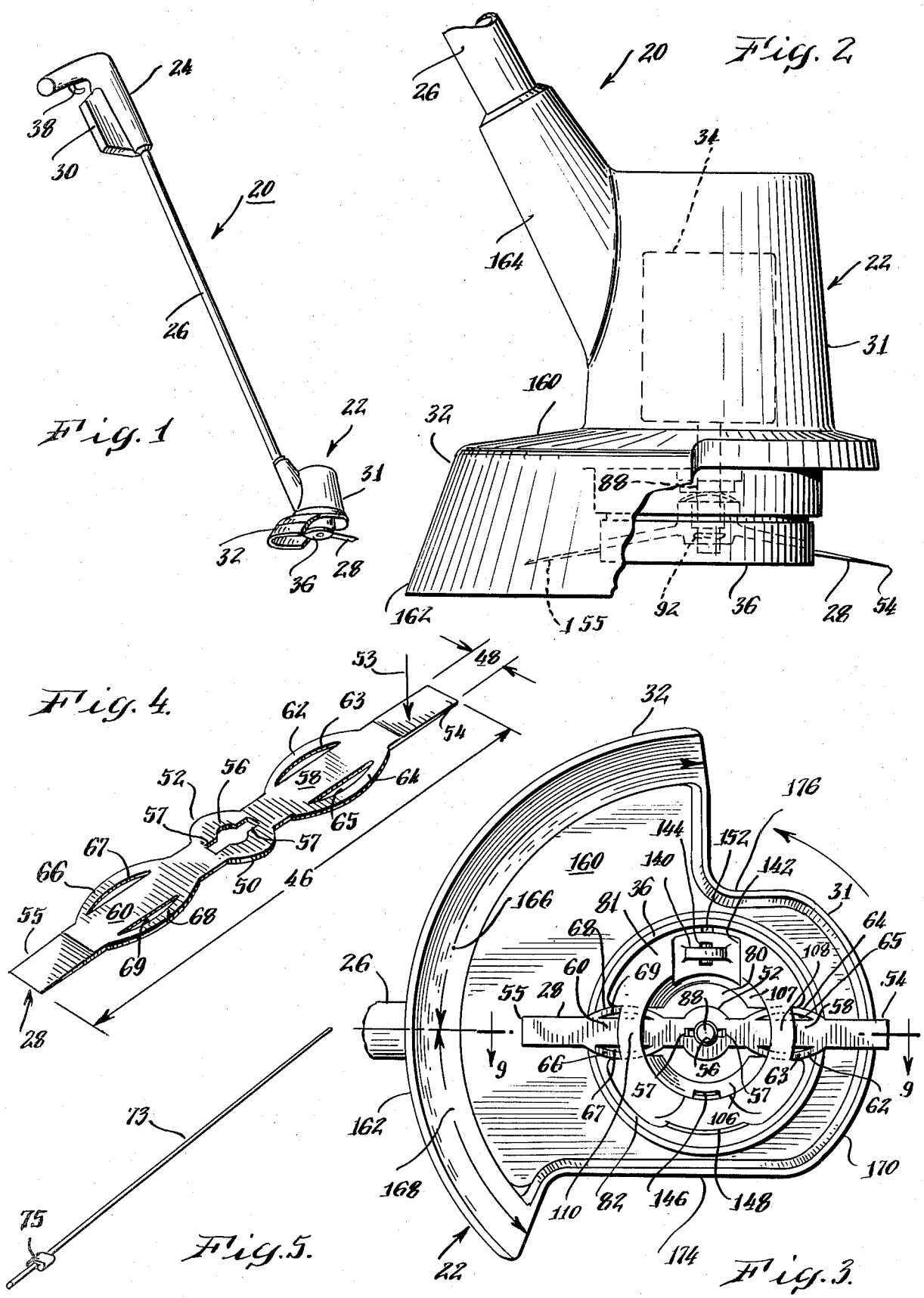

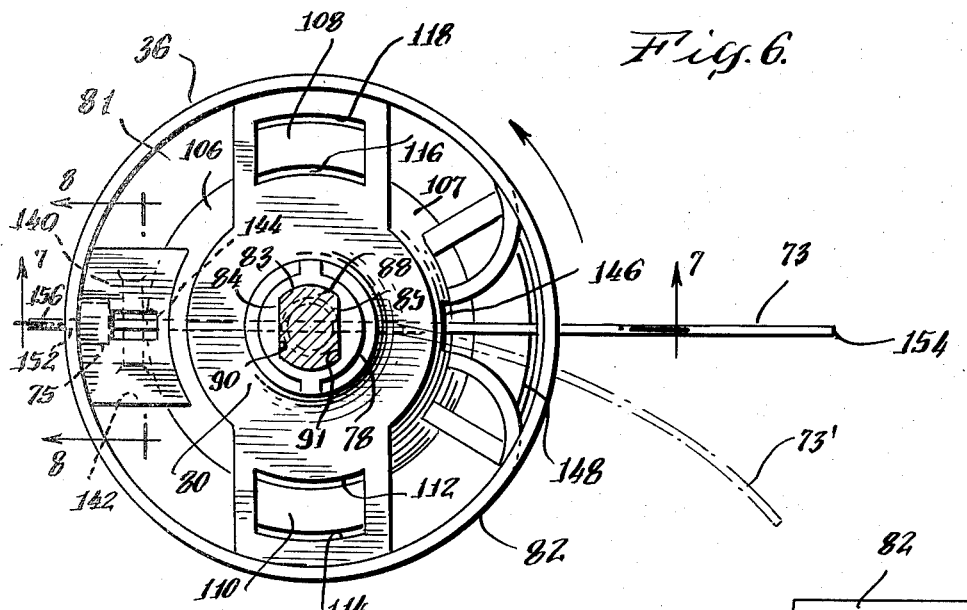
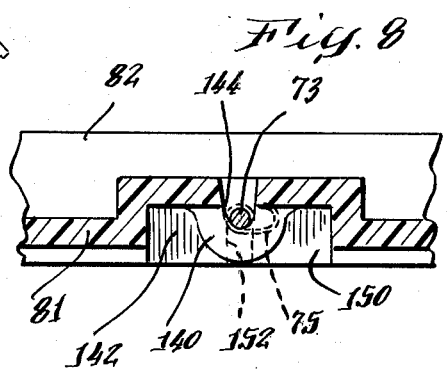
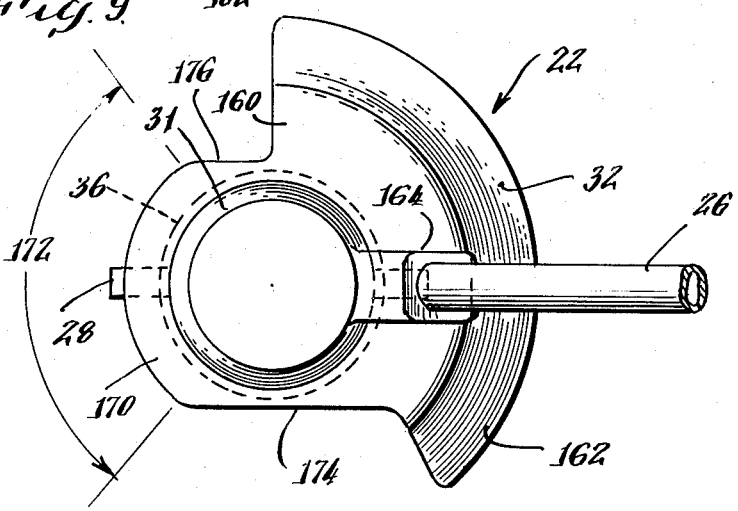

PORTABLE, ELECTRICALLY ENERGIZED, CORDLESS GRASS TRIMMER

BACKGROUND OF THE INVENTION

1. Field of the Invention

This invention relates to grass trimming devices. The invention relates more particuarly to an improved form of electrically energized device for trimming grass at difficult to reach locations.

2. Description of the Prior Art

A known form of grass trimmer device provides for rotation of a cutter comprising a relatively small diameter line of flexible material such as a polymer plastic. The line which extends from a hub is rotated at a speed sufficiently high to stiffen the line for shearing grass. This form of trimmer is principally advantageous because of the flexibility of the line material. A flexible line yields to objects and at times even conforms to structures such as a wall base thereby reducing breakage and tends to reduce projectiles as well as providing enhanced trimming in places difficult to reach with a blade type of trimmer. In addition, while impact with the hand or foot of a person may bruise, the line substantially reduces serious injury. The line trimmer, however, is subject to greater abrasive wear than a blade type of trimmer. It must be replaced frequently to maintain its cutting efficiency. The inconvenience of replacing the cutting line is reduced to some extent by the provision of an automatic line feed which, however, increases both the complexity and cost of the apparatus and reduces its reliability. Furthermore, the line trimmer is most effective when the line is rotated at a speed sufficiently high to stiffen the line for efficient grass cutting. The rate at which the line must be rotated is relatively high and requires substantial electrical energy. In addition, unless the line is continuously replenished, the wear in the line results in an imbalance which results in wear on the drive mechanism and is wasteful of electrical energy.

A grass trimming device utilizing a cutter blade formed from a relatively thin strip of flexible plastic material has been provided. This form of blade exhibits the relatively safe characteristics of the line trimming device and additionally provides a relatively neater cut and does so with a relatively more efficient usage of electrical energy. Nonetheless, a blade form of grass trimmer is incapable of readily trimming grass in the relatively more difficult to reach and restricted locations to which the line type of trimmer has access.

SUMMARY OF THE INVENTION

Accordingly, it is an object of this invention to provide an improved form of grass trimmer device.

Another object of the invention is to provide a grass trimming device which provides the relatively neat trimming and electrical efficiency characteristics of the blade trimmer while at the same time providing the access characteristics of the line trimmer.

Another object of the invention is to provide a grass trimmer device adapted to provide trimming with a flexible blade and a plastic line.

Another object of the invention is to provide a grass trimmer which alternatively utilizes a flexible blade for a cutter line.

A further object of the invention is to provide an improved means for alternatively supporting and mounting a flexible strip cutter blade or a line cutter.

A further object of the invention is to provide a means for alternatively mounting and rotating a flexible trimmer blade or a line cutter and which is substantially balanced to provide uniform loading on an electrical motor means.

In accordance with a general aspect of the invention, a grass trimmer device having a rotatable hub for supporting and rotating a grass cutter is provided. The hub is itself mechanically balanced for rotation about its longitudinal axis and is adapted to alternatively support and rotate a flexible strip cutter blade and a line cutter while maintaining substantial rotatable mechanical balance.

In accordance with more particular features of the invention, the hub comprises a generally circular shaped body which is itself mechanically balanced about its longitudinal axis. The hub includes integrally formed means for mounting a flexible strip blade in a transverse direction extending through the longitudinal axis and, alternatively, for mounting a cutter line and counterbalance means in a second transverse direction extending through the longitudinal axis. In a preferred embodiment, the first and second transverse directions are perpendicular, the counter balancing means comprise a weighted body mounted to the cutter line and the hub includes means for captivating the counterbalancing body.

BRIEF DESCRIPTION OF THE DRAWINGS

These and other objects and features of the invention will become apparent with reference to the following specification and to the drawings wherein:

FIG. 1 is a perspective view of a grass trimmer device constructed in accordance with the features of the invention;

FIG. 2 is an enlarged, partly broken away, partly sectional, side elevation view of a cutter head means of FIG. 1;

FIG. 3 is a bottom view of the cutter head means of FIG. 2;

FIG. 4 is a perspective view of a flexible strip cutter blade used with the grass trimmer device of FIG. 1;

FIG. 5 is a perspective view of a cutter line and counterplace weight used with the device of FIG. 1;

FIG. 6 is an enlarged, plan view of a hub used with the cutter head means of FIG. 2;

FIG. 7 is a view taken along the line 7—7 of FIG. 6;

FIG. 8 is a view taken along line 8—8 of FIG. 6;

FIG. 9 is a view taken along line 9—9 of FIG. 3;

FIG. 10 is a view taken along line 10—10 of FIG. 9; and,

FIG. 11 is an enlarged, plan view of the grass trimmer device of FIG. 1 illustrating a shroud configuration used with the device.

DETAILED DESCRIPTION

Referring now to the drawings and particularly to FIGS. 1 and 2, rotary blade grass trimmer device 20 is shown to comprise a cutter head means 22, a gripping handle 24 and an elongated tubular rod 26 for positioning the cutter head means 22 at a convenient distance from the handle. The handle is preferably held by the user at or below waist level for positioning the cutter head means 22 adjacent the ground. The grass trimmer 20 is a portable, electrically energized, cordless type wherein energy for exciting an electrical motor and thereby actuating a cutter 28 of the cutter head is provided by a battery power pack 30, which is mounted to the device.

The cutter head means is illustrated in greater detail in FIG. 2 and includes a housing member 31, a protective shroud 32 which is integrally formed with the housing member 31 and an electrically energized motor means 34 having a rotatable output shaft 88 to which is mechanically coupled a hub 36 for rotation thereof. The cutter which is alternatively a flexible cutter blade or a line cutter is shown in FIGS. 1 and 2 to comprise a blade 28 which is mounted to the hub 36, as indicated in greater detail hereinafter. Upon actuation of a switch 38 mounted on the handle 24 electrical energy is applied from the battery pack 30 to the motor means 34 through electrical wires (not shown) extending through the rod 26 for imparting rotary motion to the hub 36.

The cutter blade 28, as shown in detail in FIG. 4, comprises an elongated strip body having a length 46, a width 48 and a uniform thickness 50 over a relatively large segment of its length. The blade 28 is dimensioned and is formed of a material which imparts flexible characteristics to the blade. While the blade may be formed of various materials, it should be formed of a relatively low mass material such as a polymer plastic, as for example a thermoplastic. A preferred thermoplastic is nylon. The blade 28 is flexible insofar as the application of finger pressure to the blade supported at a central segment 52, in a direction normal to a plane including its length 46 and width 48 as represented by the arrow 53, causes the blade to bow substantially. On the other hand, the blade exhibits a relative stiffness at cutting segments 54 and 55 in the direction of the width 48, and a similar finger pressure applied in that direction will be sufficient to deflect the blade in that direction. Exemplary dimensions of a typical blade, which are not deemed limiting of the invention in any respect, and which provide these characteristics for the above indicated nylon material provide a length 46 of about 4 inches, a width 48 of about 0.3 inches and a thickness 50 over a major portion of the length of the blade of about 0.032 inches.

The blade 28 includes enlargements in its width along the blade length. The central segment 52 is enlarged to provide a mounting aperature 56 and a pair of slots 57 communicating with the aperture which facilitate positioning the blade 28 on the mounting hub 36 for rotation therewith. The blade further includes enlargements in its width at first and second locations 58 and 60 which are located intermediate the distal segments 54 and 55 and the central segment 52 respectively. The intermediate segment 58 includes first and second, integrally formed, resilient bowed out, arc shaped segments 62 and 64 respectively which extend from the strip in a plane formed by the length and width of the blade. Spacings 63 and 65 are formed between the segments 62 and 64 respectively and the body of the blade. These spacings enable deflection of these resilient blade segments toward the blade body upon impact by a distal blade segment with an object. This feature of the blade is disclosed and claimed in copending U.S. patent application Ser. No. 934,746 which is filed concurrently herewith and which is assigned to the assignee of this invention. The blade segment 60 includes similar first and second, integrally formed resilient, bowed out, arc shaped segments 66 and 68 and spacings 67 and 69 respectively between these segments and the blade body.

The distal end segments 54 and 55 each taper and decrease in thickness from a relatively larger uniform body thickness 50 at a radial blade location adjacent the intermediate blade segments 58 and 60 to outer edges thereof. The tapering enhances both the cutting action and the flexibility of the blade. In the exemplary blade described hereinbefore, the distal segment 54 has a length of about 0.5 inch and decreases from a relatively larger thickness of about 0.036 to about 0.030 inches to an outer relatively smaller thickness of of about 0.028 to about 0.018 inches. The blade 28 is symmetrical about its central aperture 56 and the distal segment 55 exhibits the same segment length and variation in thickness.

An alternative line cutter is illustrated in FIG. 5 and comprises an elongated body 73 having a generally circular cross section. The body 73 is formed of a material which, in cooperation with the dimensional characteristics of the line, imparts flexibility to the line. In an exemplary line, which is not deemed limiting of the invention in any respect, the line is formed of a thermoplastic material such as nylon monofiliment having a length of about four inches and a diameter of about 0.06 inches.

A counterbalancing means is provided for establishing substantial rotational balance of the line when mounted for rotation on the hub 36. The counterbalancing means is mounted to the line and, as shown in FIG. 5, comprises a metalic strip body 75 which is crimped to the line for securing it thereto. As indicated hereinafter, the relative weight of the line 73 and the body 75, as well as the mounting position of the strip body 75 on the line 73 is selected for providing rotational balance of the line on the hub.

A means for alternatively mounting the cutter blade 28 or the cutter line 73 for rotary motion comprises the hub 36. The hub is formed by a generally circular shaped hub body (FIGS. 2, 3 and 6–10) having an integrally formed shaft mounting segment 78, an integrally formed surface segment 80, an integrally formed collar segment 8, and an integrally formed longitudinally extending wall segment 82. The shaft mounting segment 78 is generally cylindrically shaped and includes an upper drive coupling bore segment 83 having a cross-sectional configuration for engaging an output shaft 88 of the motor means 34 for imparting rotary motion to the hub. The cross-sectional configurations of the segment 83 and the shaft 88 are best illustrated in FIG. 6. Hub segment 83 includes flat segments 84 and 85. The output shaft 88, which is generally cylindrically shaped, includes flats 90 and 91 formed thereon, for engaging the hub flats 84 and 85 respectively. The flats on the output shaft 88 and on the hub mounting segment 78 imparts rotary motion from the shaft 88 to the hub 36. Cylindrically shaped output shaft 88 extends into the lower cylindrical hub mounting segment 86 and engages the hub at that location. The engagement is provided by an O ring 92 (FIG. 2) which is positioned in a groove formed on a distal segment of the shaft 88. The O ring 92 establishes an interference fit between the shaft 88 and the lower cylindrical wall surface of the hub mounting segment 86. A ridge formed in the hub segment 86, which, for purposes of clarity in the drawing is not illustrated, engages an upper segment of the O ring 92 and inhibits axial motion of the hub in a downward direction as viewed in FIG. 2. This mounting arrangement facilitates removal of the hub from the output shaft 88 for cleaning of accumulated grass and debris, if any. The hub can be conveniently removed by hand pressure applied in a direction for overcoming a restraining force of the O ring and ridge to withdraw the hub from the shaft. The hub 36 can be conveniently refitted on, and mounted to, the shaft 88 with firm hand pressure and the interference fit provided by the O ring and ridge will retain the hub on the shaft during the cutting operation. Alternative hub mounting means can be provided such as a screw and washer engaging the shaft 88 and inhibiting axial motion of the hub in a downward direction as viewed in FIG. 2.

The hub surface segment 80 includes a first integrally formed, centrally located, recessed surface 100 which is curved in the direction of a longitudinal axis 101 and outer peripheral surface segments 102 and 103. The raised integrally formed collar segment 81 is spaced radially and longitudinally from the central surface segment 100 by frusto conical shaped segments 106 and 107. The collar segment 81 is generally circular and of narrow width at diametrically opposite locations. The narrowed raised collar segments 108 and 110 define with the surfaces 100, 102, 103 and the conical shaped segments 106 and 107 a first pair of slots 112, 114 and a second pair of diametrically opposite slots 116 and 118.

The blade 28 is mounted on the hub body 36 in a direction transverse to the axis 101 and is restrained along a portion of its length by the hub body 36 for maintaining the blade in a predetermined cutting plane. The central segment 52 of the blade is positioned on an integrally formed, cylindrically shaped, raised hub segment 124. This hub segment includes a pair of extending index bosses which align with and engage the slots 57 formed in the central segment 52 of the blade. The intermediate segments 58 and 60 of the blade extend through the slot pairs 112, 114 and 116, 118 respectively. The blade will thus be deflected in an axial direction from the central segment 52 to conform with the curved surfaces 100, 102 and 103. It will be restrained in this deflected position by virtue of the bridging collar segments 108 and 110. The blade body is thus mounted and restrained in a predetermined cutting plane.

The hub 36 includes integrally formed means for mounting the line 73 and the counterbalancing weight 75. As illustrated in FIGS. 6 through 10, this means comprises a body segment 140 extending longitudinally in a direction of the axis 101. The generally circular shaped collar segment 81 is discontinuous in an arcuate area 142 and the segment 140 is positioned in this area and includes a first radially aligned aperture 144. The segment 140 is shown to have a generally pillow block shaped configuration. Aperture 144 is sized for receiving and extension of the cutter line 73 therethrough in a direction transverse to the axis 101. The line 73 extends from the aperture 144 through a second arcuate aperture 146 which is integrally formed in the frusto conical segment 107. The aperture 146 comprises a rectangular window sized to enable the line 73 to flex in an angular direction. The line 73 extends under a segment 147 of the collar and through a second, elongated arcuate aperture or window 148 which extends over a segment of the hub periphery and enables flexing of the line cutter 73 over an arcuate distance. This is illustrated in FIG. 6 by the line 73 which is shown in an undeflected position 73 and in a deflected position 73'.

The cutting segment of the cutter line 73 which extends beyond the aperture 148 ordinarily causes a mechanical imbalance. The counterbalancing weight 75 is mounted to the line 73 and is positioned between the hub segment 140 and an arcuate segment 150 of the hub wall 82. A slot 152 is formed in the segment 150. The hub segment 140 and the wall segment 152 are spaced apart a distance for captivating the mounted counterweight body 75 therebetween. The cutter line 73 and mounted counterweight are positioned on the hub 36 by extending a distal line segment 154 through the aperture 144 as viewed in FIG. 7 and then successively leading this segment through the apertures 146 and 148. The counterweight 75 is positioned between the body segment 140 and the wall segment 152 and a relatively short line segment 156 is positioned in and extends radially from the slot 152. The line segment 156 facilitates line removal since it provides a hand accessible segment of the line enabling the withdrawal of the weight 75 and the line from the hub 36. During a trimming operation, the described mounting maintains the line cutter in its mounted position. As illustrated in FIGS. 6 through 10, the aperture 144 is aligned with a radial line from the axis 101 and is located diametrically opposite a radial axis of the apertures 146 and 148. A diameter on which the apertures 144, 146 and 148 lie is preferably mutually perpendicular with a transverse axis of the blade 28 when mounted on the hub 36.

The mounted line cutter provides for substantially balancing the mass of the line as the line is rotated thereby maintaining mechanical balance of the rotating hub arrangement. Hub 36 is formed as a balanced body. Mounting of the blade 28 does not disturb the mass balance since blade 28 is symmetrical about its central aperture 56. However because the extension of line 73 from the hub and because of its wearing characteristics, the center of mass of line 73 will vary. As can be seen in FIG. 6, a segment of the line 73 extends from the hub 36 and this segment would ordinarily cause an imbalance in the mechanical system. The counterweight 75 is provided to counterbalance the mass of the extending line segment 73. Since it is desirable to provide an extending segment 156 for facilitating mounting and removal of the line cutter, the mass 75 is positioned at a location and has a weight which, in combination with a segment of the line 73 extending between the longitudinal axis 101 and the distal segment 156, exhibits a mass substantially equivalent, as described hereinafter, to the mass of that segment of the line 73 extending between the axis 101 and the distal segment 154.

Usage of the line cutter results in wear of the line and as a result, the mass of that segment of the line 73 between the axis 101 and the distal segment 154 will decrease. In operation, a user will install a counterbalanced line and continue to use it on the grass trimmer 20 until the line 73 is worn to a point at which it is ineffective in cutting grass. The line 73 and the counterbalancing weight 75 are selected to provide a normalized balanced mass over the useful life of the line. In accomplishing this, the line assembly is initially, slightly positively imbalanced. By positive imbalance is meant that the mass of the line 73 between the axis 101 and the distal tip 154 will be greater than the combined mass of the line and weight between the axis 101 and the distal segment 156. The center of mass is thus slightly to the right of this axis as viewed in FIG. 6. Use of the trimmer results in wear on the line causing the rotating hub to approach a balanced mass condition at which time the center of mass is effectively coincident with the axis 101. In order that an extended usage may be obtained from a single line-counterweight assembly, the line 73 is adapted to wear from a relatively positive imbalanced condition through the balanced condition, and to a relatively negative imbalanced condition. At relatively negative imbalance, the center of mass of the line weight assembly moves slightly to the left of the axis 101 as viewed in FIG. 6.

In an exemplary arrangement, the hub 36 had a diameter of about 2.50 inches, the line 73 had an initial length of four inches and a nominal weight of about 0.192 grams and the counterweight body 75 had a nominal weight of about 0.102 grams. The length of the line 73 between the longitudinal axis 101 and the tip of the distal segment 156 was about 1.25 inches, the distance between the axis 101 and the center of mass of the body 75 was about 1.040 inches, and the distance between the axis 101 and the tip of the distal segment 154 for a newly installed line 73 is about 2.75 inches. Under these conditions, an initial positive imbalance has a magnitude of 0.0254 inch-grams. The point of zero imbalance occurs when the line wears to a length of about 2.50 inches and minimum useful length and negative imbalance of 0.052 inch-grams occurs when the line wears to a length of about 2.0 inches.

An improved protective shroud for use with the grass trimmer of FIG. 1 is illustrated in FIGS. 2, 3 and 11. The shroud includes a generally planar level surface 160 which extends in normal direction from the housing 31 and is integrally formed therewith. A protective skirt 162 is integrally formed with the surface segment 160 and depends from this segment. As best seen in FIG. 3, the shroud surface segment 160 and the depending skirt 162 is generally arcuate shaped and extends about the axis 101 for an angular distance of about 135°. The depending skirt 162 is coextensive with the surface 160 for substantially the same arcuate distance. The skirt segment 162 is spaced laterally from the hub axis as seen in FIG. 3 for enabling clearance of the rotating blade 28 and for enabling clearance of a rotating line 73. The handle member 26 is coupled to the housing 31 at a location on the housing which positions the shroud skirt 162 between a user and the area to be trimmed when the cutter head means 22 is positioned in its usual cutting attitude forward of the user. The housing includes a mounting means 164 for receiving the rod 26 and for mounting the cutter head means 22 thereto. The mounting means 164 is positioned on the housing and extends therefrom for maintaining the position of the shroud 162 between the user and the grass being cut. The surface segment 160 includes a segment 166 extending for an arcuate distance of about 90° and an arcuate segment 168 extending for an arcuate distance for about 45° from the mounting means 164. Thus, as viewed by a user from above the cutter head means 22, the protective shroud extends to the user's right for a distance of about 90° about the housing represented by segment 166 and for a distance of about 45° about the housing as represented by segment 168.

The shroud further includes a skirtless, planar, arcuate segment 170 as illustrated in FIG. 11. This segment which has an arcuate extension 172 of about 135° has a radius substantially less than the shroud segment 166 and 168 and less than the radius of a newly mounted blade 28. Accordingly, a cutting segment of the blade 28 extends beyond the segment 170 in a radial direction. When the grass trimmer 20 is utilized to trim adjacent abrasive vertical surfaces, such as concrete, stone or brick walls, the extending cutting segment of the blade 28 (FIG. 11) will abrade and shorten relatively rapidly. Thus, although the segment 170 may be positioned in contact with a vertical wall, the cutting efficiency of the trimmer will be substantially reduced and close trimming immediately adjacent the base of the wall will be limited. In accordance with another feature of the invention, a means is provided for enhancing the positioning of a cutter blade adjacent the base of vertical surface for close cropping immediately adjacent the base. The shroud is configured to include a segment thereof having a peripheral segment which is positioned at a shorter distance from the axis of the hub than is the periphery of the leading arcuate segment 170 of the trimmer. In FIGS. 3 and 11, there is illustrated an integrally formed segment 174 extending between the leading arcuate shaped trimmer segment 170 and the segment 168. Segment 174 provides a rectilinear peripheral shroud segment in which the periphery of the segment is spaced at a lesser distance from an axis of the hub 36 than is the periphery of the arcuate segment 170. When the blade 28 is abraded to a radial dimension of the periphery of the segment 170, the blade 28 will still be sufficiently long to extend beyond the periphery segment 174. Accordingly, the segment 174 of the shroud enables the trimmer to be manipulated along vertical walls and like surfaces for providing relatively close cropping at the base of the wall even when the blade 28 has been abraded to the extent that its cutting segment no longer extends beyond the arcuate segment 170 of the shroud. In operation, the segment 170 is positioned against the wall surface and the trimmer is rotated in a clockwise direction about a junction of the wall surface and the segment 170 to gradually lead the blade 28, which extends beyond the segment 174, into cutting engagement with vegetation relatively close to the base of the wall. A similar smaller segment 176 is provided between the leading arcuate segment 170 and the shroud segment 166.

An improved, portable, electrically-energized cordless grass trimmer has thus been described which is adapted to alternatively utilize, and to provide balanced rotation of a flexible strip cutter and a line cutter. Balanced rotation is provided by use of a balanced hub, by the use of a symmetrical cutter blade, and by the use of a cutter line and counterbalance. The cutter thus provides the relatively neat cut of a blade cutter yet provides access to the more restricted locations more readily reached by the line cutter. An improved shroud is also provided which enhances trimming relatively close to a vertical wall.

While there has been described a particular embodiment of the invention, it will be apparent to those skilled in the art that variations may be made thereto without departing from the spirit of the invention and the scope of the appended claims.

What is claimed is:

1. A portable, hand held grass trimmer device comprising:
    (a) an electrical drive means having an output shaft which is rotatable upon energization of said drive means;
    (b) means for energizing said drive means;
    (c) a generally circular shaped one piece hub having a periphery and means for mounting said hub to said output shaft for rotation therewith, said hub mechanically balanced for rotation about a longitudinal axis thereof;
    (d) said hub including integrally formed segments for mounting for rotation therewith a flexible strip cutter blade and alternatively an elongated cutter line having a counterbalance body mounted to said line;

(e) said integrally formed segments providing slots through which a cutter blade extends and is restrained on said hub and apertures through which a cutter line extends and is restrained on said hub; and, (f) said counterbalancing body is mounted to said cutter line for positioning of said counterbalancing body on said hub within said hub periphery.

2. The grass trimmer of claim 1 including a flexible cutter blade formed of a strip of polymer plastic, said blade having a length and a width, said blade exhibiting flexibility upon the application of a finger force thereto in a direction normal to a plane including said length and width and exhibiting stiffness upon the application of a finger force thereto in a direction of said width.

3. The grass trimmer of claim 1 including an elongated flexible cutter line and counterbalance body mounted to said line, said line having a length and said counterbalancing body mounted to the line at a location along the length for providing that a cutter segment of said line extends from said hub at a single location along said periphery and said cutter line and counterbalancing body exhibit a center of mass at a predetermined location along the length of said line within said hub periphery and adjacent the longitudinal axis of said hub body.

4. The grass trimmer device of claim 1 wherein said integrally formed segments mount said flexible blade in a transverse direction through said longitudinal axis and said cutter line in a transverse direction extending through said longitudinal axis.

5. The grass trimmer of claim 4 wherein said transverse directions are relatively perpendicular.

6. The grass trimmer of claim 1 wherein said segments providing blade restraining slots comprise first and second segments integrally formed with said hub and positioned at diametrically opposite locations on said hub body.

7. The grass trimmer of claim 3 wherein said segments for mounting said cutter line and counterbalance means comprises a hub body segment having an aperture formed therein through which said line extends, a second aperture formed in said hub, said line extends from said second aperture beyond said hub for providing an extending cutter segment and said counterbalancing means is positioned along a radial line extending through said first aperture.

8. A grass trimmer device comprising:
(a) an electrical drive means having an output shaft which is rotatable upon energization of said drive means;
(b) means for energizing said drive means;
(c) a generally circular shaped one piece hub having means for mounting said hub to said output shaft for rotation therewith, said hub mechanically balanced for rotation about a longitudinal axis thereof;
(d) said hub including integrally formed segments for mounting for rotation therewith a flexible strip cutter blade and alternatively an elongated cutter line and counterbalance means;
(e) an elongated flexible cutter line and counterbalance means for establishing a center of mass for said line and counterbalance means at a predetermined location along the length of said line;
(f) said segments for mounting said cutter line and counterbalance means comprising a hub body segment having an aperture formed therein through which said line extends, a second aperture formed in said hub, said line extending from said second aperture beyond said hub providing an extending cutter segment and said counterbalancing means is positioned along the radial line extending through said first aperture.

9. The grass trimmer of claim 8 wherein said second hub body segment comprises a peripheral wall segment and said first body segment is spaced radially inward from said second body segment.

10. The grass trimmer of claim 9 wherein said counter-balancing means comprises a weight mounted to said line, said weight is positioned between said first and second body segments and is captivated therebetween.

11. The grass trimmer of claim 10 wherein said first body segment includes an aperture formed therein, said counter-balancing weight is mounted to said line and is spaced adjacent a distal segment of said line, and said distal segment extends through said second aperature.

12. The grass trimmer of claim 11 wherein said counterweight comprises a body of metal crimped to said line.

13. The grass trimmer of claim 12 wherein the mass and position of said weight mounted to said line establishes a range of mechanical balances for said cutter line which varies with wear of the line from a relatively positive overbalance, to a balanced condition, and to a relatively negative imbalance.

14. A portable cordless grass trimmer comprising:
(a) a head means including an electrical drive means having an output shaft which is rotatable upon energization of said drive means;
(b) a handle member;
(c) an elongated rod coupled to said handle member at one distal segment thereof and supporting said head means at another distal segment thereof;
(d) a source of electrical energy mounted to said trimmer device;
(e) means for selectively applying electrical energy to said head means for energizing said motor causing rotation of said output drive shaft;
(f) a generally circular shaped one piece hub body mounted to said output drive shaft, said hub mechanically balanced for rotation about a longitudinal axis thereof;
(g) said hub body including integrally formed blade mounting segments providing mounting slots for restraining on said hub for balanced rotation therewith a flexible strip cutter blade extending through said slots transversely to said longitudinal axis; and,
(h) said hub body including integrally formed line mounting segments providing mounting apertures for alternatively restraining on said hub for balanced rotation with said hub body an elongated cutter line extending through said apertures and a counterbalanced weight, said line and weight positioned along an axis extending through said longitudinal axis.

15. A hub body for mounting a cutter to a portable grass cutter device comprising:
(a) a generally circular shaped body having a longitudinal axis thereof;
(b) said hub mechanically balanced for rotation about said longitudinal axis;
(c) blade mounting segments integrally formed with said hub for mounting an elongated, flexible strip cutter blade in a direction extending transverse to said longitudinal axis for balanced rotation with said hub, said segments providing mounting slots therein for extension of said blade therethrough for restraining said blade on said hub; and, (d) line mounting segments integrally formed with said hub for mounting an elongated cutter line and counterbalance weight for balance rotation thereof, said line mounting segments providing mounting apertures for extension of said line through said apertures for restraining said line on said hub.

16. The hub of claim 15 wherein said segments for mounting said cutter line and counterbalance weight includes a pillow block shaped body segment extending in a longitudinal direction, said segment including a first radial extending aperture formed therein for receiving and supporting said cutter line, a second aperture formed in another integrally formed segment of said hub at a second location, and means for captivating a counterbalancing weight at said second body segment.

17. The hub of claim 16 including a slot formed in a peripheral segment of said hub and aligned radially with said first aperture.

18. A portable, hand held, grass trimmer device comprising:
    (a) an electrical drive means having an output shaft which is rotatable upon energization of said drive means;
    (b) means for energizing said drive means;
    (c) an elongated, symmetrically formed flexible strip cutter blade;
    (d) an elongated cutter line having a cutter segment thereof and a counterbalancing body mounted thereto along a length of said line;
    (e) a one piece hub body having a periphery thereof coupled to said aperture for rotation therewith.
    (f) said hub body including integrally formed segments for alternatively mounting and providing rotation of said cutter blade, and, said cutter line; and,
    (g) said hub body including integrally formed blade mounting segments providing mounting slots for extension of said flexible strip cutter blade therethrough and restraining said blade to said hub body and blade mounting segments providing mounting apertures for extension of said cutter line therethrough for alternatively restraining said cutter line and counterbalancing body on said hub for balanced rotation therewith, said cutter line and said counterbalancing body establishing a center of mass at a location within said periphery, and said line cutter segment extends from said periphery at a single location.

19. The grass trimmer device of claim 18 wherein said cutter line and counterbalancing means have a length, a weight and are relatively positioned for providing a normalized balanced mass thereof during use of the line whereby said line is initially positively inbalanced and during its use the line wears and shortens to a balanced condition and by continued use the line wears and shortens to a relatively imbalanced condition.

* * * * *